United States Patent [19]

Hetzel

[11] Patent Number: 4,588,143
[45] Date of Patent: May 13, 1986

[54] STATOR WINDING MACHINE
[75] Inventor: Max Hetzel, Deitingen, Switzerland
[73] Assignee: K & S Schrittmotoren GmbH, Schwabach, Fed. Rep. of Germany
[21] Appl. No.: 540,382
[22] Filed: Oct. 11, 1983
[30] Foreign Application Priority Data Oct. 22, 1982 [CH] Switzerland .................. 6152/82

[51] Int. Cl.⁴ .......................................... H02K 15/085
[52] U.S. Cl. .................... 242/1.1 R; 226/44; 242/7.03
[58] Field of Search ............. 242/1.1 R, 4 R, 7.21, 242/7.22, 45, 75.51, 7.03; 29/596

[56] References Cited

U.S. PATENT DOCUMENTS

| 2,624,518 | 1/1953 | Schryver et al. | |
| 2,847,170 | 8/1958 | Lill et al. | 242/1.1 R |
| 3,052,418 | 9/1962 | Gorski et al. | 242/1.1 R |
| 3,082,966 | 3/1963 | Frederick | 242/1.1 R |
| 3,220,094 | 11/1965 | Roberts | |
| 3,251,559 | 5/1966 | Moore | 242/1.1 R |
| 3,334,825 | 8/1967 | Friedrich | |
| 3,379,385 | 4/1968 | Osweiler | 242/7.22 |
| 4,170,505 | 10/1979 | Zgraggen | |

FOREIGN PATENT DOCUMENTS

| 1134892 | 12/1956 | France | |
| 2355396 | 1/1978 | France | |
| 568733 | 4/1945 | United Kingdom | 242/1.1 R |

Primary Examiner—Billy S. Taylor
Attorney, Agent, or Firm—Wender Murase & White

[57] ABSTRACT

For winding a ferromagnetic body with axially extending slots opening inwardly, such as a stator, the winding wire is inserted into the slots and laid out onto coil ends by means of pairs of wire dispensing members (8, 10) whereby the wire is repeatedly passed through the bore of the body and inserted into slots and laid out onto the coil heads at one side of the iron body by means of the one of said members (8) while the wire is received by the other member (10) at the other side of said body and is laid out onto a coil end at this other side. The winding operation is executed automatically and economically with optimum conditions regarding efficiency and specific power of the electric machine.

13 Claims, 24 Drawing Figures

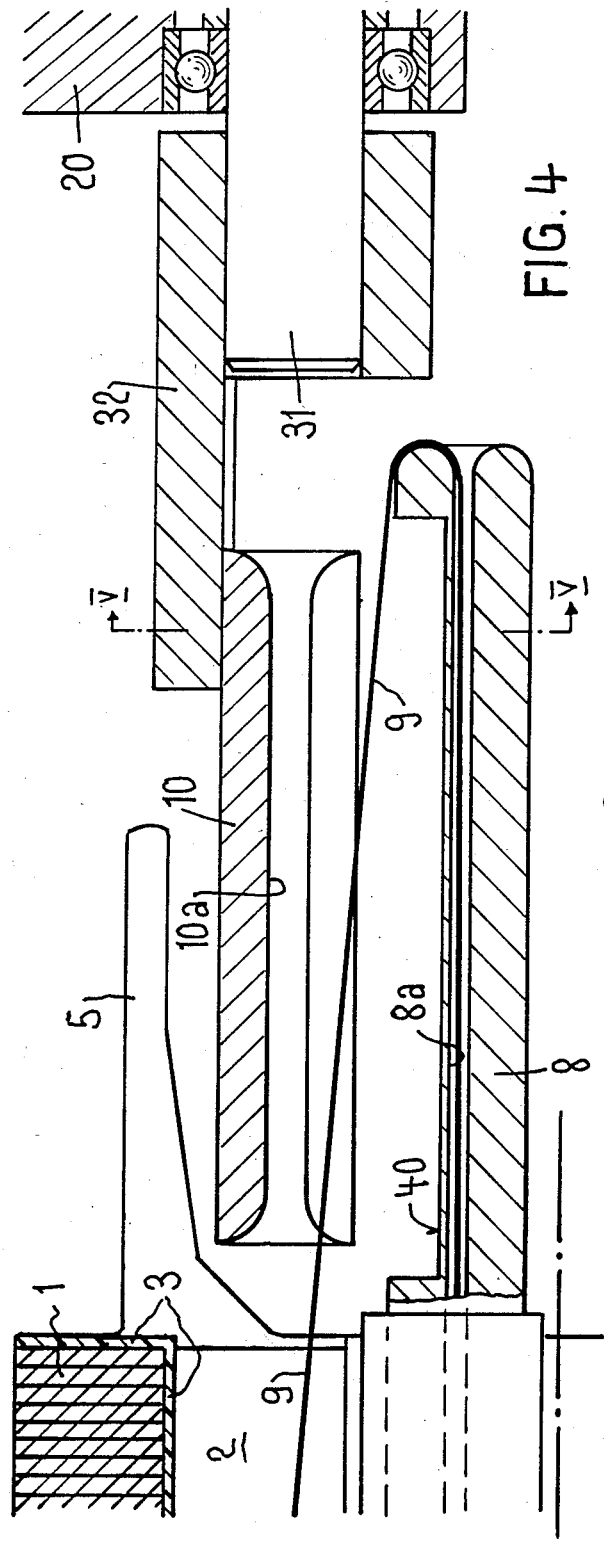
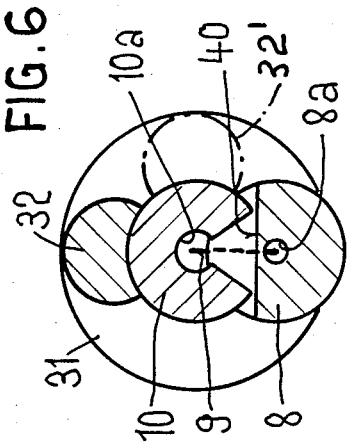
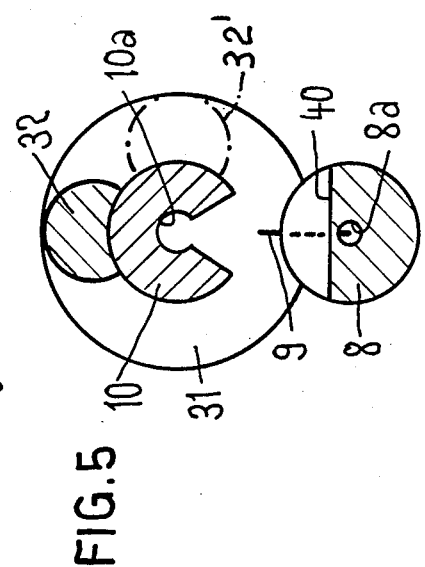
FIG. 4
FIG. 5
FIG. 6

STATOR WINDING MACHINE

BACKGROUND OF THE INVENTION

This invention relates to a method for automatically winding an annular ferromagnetic body for a rotating electric machine, having axially extending slots opening radially inwardly. Coils are wound each by means of a wire delivering member which may be shifted axially through the bore of said body from one side thereof to the other, and of at least one wire receiving member, by repeated transfer of the winding wire between said wire delivering member and said wire receiving member, axially passing said wire through the bore of said body and inserting of said wire into a slot and forming of a turn of each coil end by radial outward displacement of one of said members, relative rotation between this member and said body and radial inward displacement of said member.

A method of this kind is disclosed by U.S. Pat. No. 3,220,094. The winding wire is fed and inserted into the slots by means of wire delivering members oriented transversally to the axis of the bore of said body and which may be axially displaced through the bore. Each wire section inserted into a slot is subsequently seized by a hook axially outside said body, and the wire is pulled radially outwardly by said hook and laid out onto axially projecting supporting members of insulating material. Said wire delivering members positioned transversally to the axis of the bore of said body are limiting the method to winding of ferromagnetic bodies having wide bores, and the simple hook-shaped wire receiving members do not allow optimal layout of the wire in the coil ends because the wire section running in an inclined direction from the wire delivering member to the wire receiving member risks to come into conflict with the axially extending supporting members. In order to keep the wire free from these supporting members it is necessary to provide for substantial axial extension of the wire delivering member and substantial radial extension of the wire receiving member from the ferromagnetic body. Wire receiving hooks have to be provided at each side of the body.

The French Pat. No. 1,134,892 discloses a system wherein wire delivering members are fixed on toothed racks radially displaceable in a carrier adapted to be axially shifted through the bore of the ferromagnetic body. Said wire delivering members may be radially displaced outside each face of the ferromagnetic body in order to lay out the wire over axially projecting supporting hooks and for thereby forming the coil ends. However, such a mechanism is so complicated and bulky that it may only be used in connection with large dimensions of the bore of the ferromagnetic body, and the liberty in optimally laying out the wire in the coil ends are limited.

SUMMARY OF INVENTION

The purpose of the present invention is to provide a winding method and a winding machine for carrying out the same allowing optimal winding even of ferromagnetic bodies of small bore diameter.

One solution of the problem is characterized in that a substantial length of the wire is received by means of said wire receiving member from an axially elongated wire delivering member. The wire is passed over the length of axially projecting supporting members at each side of said ferromagnetic body by means of said wire delivering member and said wire receiving member, and said wire is alternatively applied onto said supporting members by means of corresponding displacement of the wire delivering member and the wire receiving member. Due to the fact that the wire is at least approximately axially fed towards the body at each side thereof for laying out the wire onto the coil ends an optimal guiding of the wire around the axially projecting supporting members for the coil ends and consequently an optimal shaping of the coil ends is achieved. This not only results in a high utilisation of the available winding space but it is also possible to attain a high space factor of the winding. As the wire delivering member and the wire receiving member are similarly designed and driven for laying out the wire, only one of each member is required for winding one wire.

The winding machine according to this invention is characterized in that as well said wire delivering member as said wire receiving member are of axially elongated slim shape and that similar driving means are provided for each of said members for laying out said wire between and radially outside of axially projecting support members at each end face of said ferromagnetic body. Due to the use of axially elongated slim wire delivering members and wire receiving members optimal winding is also possible with small diameters of the bore of the ferromagnetic body.

Control of the displacement of the wire delivering members and wire receiving members is preferably effected by means of a microprocessor by which the displacements are digitally controlled with or without feed-back of the position of adjusted members.

With a winding method or a winding machine as explained above, wherein the wire is repeatedly axially fed through the bore of the ferromagnetic body from one side to the other, the wire being thereafter captured by means for wire capture in the wire receiving member and pulled out to form a loop and is laid out onto a coil end, and wherein the wire is finally brought back through the bore of the body, very important differences of the speed of the wire fed to the wire delivering member occur. On the other hand the pull in the wire should always have an optimum value. Therefore, this invention also relates to a winding machine generally as set out above and characterized in that the wire is fed over a tensioning pulley coupled with a motor, this motor being adapted to be fed by a current determining the pull in the wire. This tensioning device allows control of the pull in the wire during the winding operation.

This invention also relates to a stator of an electric machine generally as set out above and characterized in that one coil side only is disposed in each slot and that each coil of a first kind having a coil end in an axially inner position and having a winding pitch of three slots is symmetrically disposed between two coils of a second kind having their coil ends in an axially outer position and having each a winding pitch of three slots and having each one coil side between the coil sides of a coil of the first kind, and that the number of supporting members supporting a coil end of a coil of the first kind and a coil end of a coil of the second kind is half the number of slots. Since a number of supporting members of sufficient axial length for supporting two coil ends which is half the number of slots is required brings substantial advantages as well relating to the dimensions of the winding ends at the faces of the stator as relating to the freedom of displacement of the wire delivering members and the wire receiving members during the winding operation.

DESCRIPTION OF THE DRAWINGS

FIG. 1a is a schematic illustration of the winding;

FIG. 4 is a section on a larger scale through a wire delivering member and a wire receiving member such as a part of the stator to be wound;

FIG. 5 shows a section along line V/V in FIG. 4;

FIG. 6 shows a section according to FIG. 5 for the wire receiving position;

DETAILED DESCRIPTION OF THE INVENTION

Figure 1:
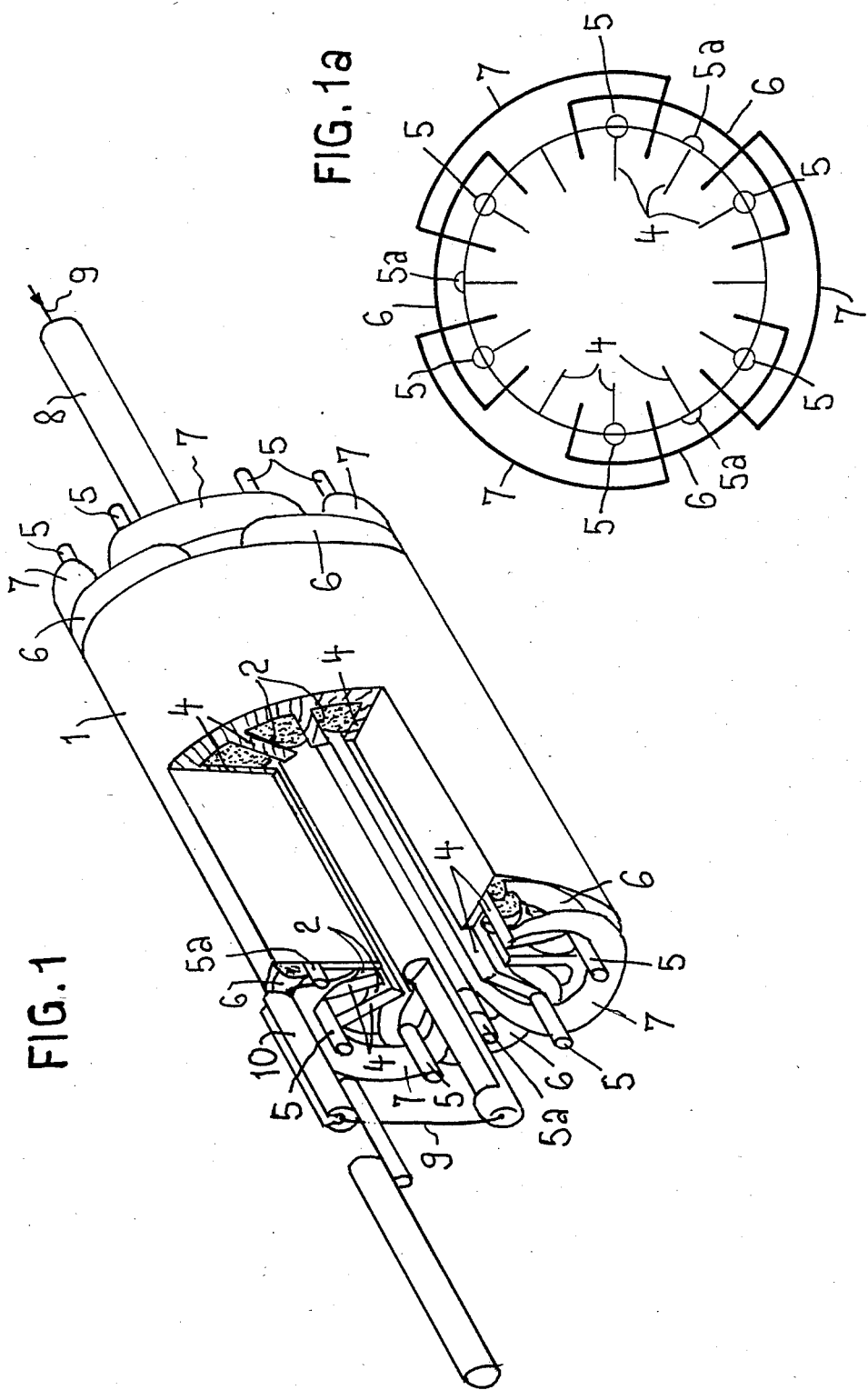
FIG. 1 is a perspective view, partially in section, of a wound stator and of the winding members.

With reference to FIG. 1 the basic concept, of the problem and of the solution thereof in accordance with the present invention will now be explained in detail. The problem is to wind automatically the iron body 1 of the stator of a stepping motor having a rotor (not shown in the drawing) with four permanent magnetic poles. The iron body 1 is usually constructed from a stack of stamped iron sheets, not illustrated in FIG. 1, for the sake of simplicity. The slots 2 and the end faces of the iron body are coated with an insulating layer 3 (FIG. 4) produced by injection moulding, this coating is not illustrated in FIG. 1 for the sake of simplicity.

The iron body 1 has twelve slots 2. Within reach of six webs or poles 4 of the iron body 1, that is within reach of each second web, four axially projecting supporting pins 5 are formed in the insulating coating at each face of the stator, the length of each of these pins 5 being sufficient for supporting two crossing coil ends of the winding. As particularly shown in FIG. 1a, the winding has three inner coils 6 of which the coil ends are adjacent the faces of body 1, these coils 6 being staggered by 120°, and three outer coils 7 having coil ends axially outside the inner coils 6 and also staggered by 120°. The winding pitch of each coil is three slots, whereby adjacent coil sides of neighbouring inner coils 6 are located in neighbouring slots 2. Adjacent coil sides of neighbouring outer coils 7 are located in the two slots bridged by each inner coil 6. This type of winding is not only particularly suitable for automatic winding of the stator in accordance with the present invention as will be shown later but it also allows a favourable operation of a three-phase stepping motor. The interconnection of the coils and their feeding with step pulses is of no importance for the present invention and will not be described.

As shown in FIG. 1 and by full circles in FIG. 1a supporting pins 5 of full axial length are located where two coil sides or coil ends respectively from neighbouring slots are crossing each other directly outside the slots. The ends of the inner coils 6, which are wound first, have to be supported in their middle to which end three supporting pins 5a of smaller axial length are provided, these pins being indicated in FIG. 1a by halfcircles. In three positions, namely in the middle of each of the outer coils 7 no supporting pins are required. The particular kind of winding which may be of similar design but for higher pole numbers on larger machines its has the advantage that the number of supporting pins of full axial length is only half the number of slots of the iron body. This is of particular importance for the freedom of displacement of the members for laying out the winding wire within reach of the coil ends as will be described below.

One pair of cooperating winding members is illustrated in FIG. 1. The one member is a tubular elongated wire delivering member 8 through which the winding wire 9 is axially fed from the right side in FIG. 1. In the phase of the operating cycle illustrated in FIG. 1, the wire 9 leaves the free end of member 8 and is passed through a wire receiving member 10 which is positioned outside the supporting pins 5. By rotating the iron body 1 in clockwise direction in FIG. 1 from the position as illustrated the wire leaving one of the slots may be laid out onto the adjacent coil end 7. Thereafter the member 10 is diplaced radially inwardly whereby the wire 9 always remains under tension and may be pulled in a backwards direction if necessary, then the wire is released by member 10 by inward rotation thereof, and the wire position is then is controlled by member 8. Member 8 is then axially retracted through the bore of the iron body 1, that is to the right in FIG. 1, in order to pull the wire into one of the slots. By combined radial displacement of member 8 and backward rotation of the iron body in counter-clockwise direction, one turn of the coil end at the other face of the iron body, that is on the right face in FIG. 1 is formed. This operation will be explained in detail later on.

However, it is already seen that by repeated cyclic axial and radial displacement of members 8 and 10, whereby the wire is repeatedly received by member 10 from member 8, the wire is inserted into the slots and positioned onto the coil ends. Due to the elongated slim shape of members 8 and 10, proper winding of iron bodies having a narrow bore is possible, and the displacement of each member 8 and 10 is not substantially obstructed by supporting pins 5 and 5a.

Figure 2:
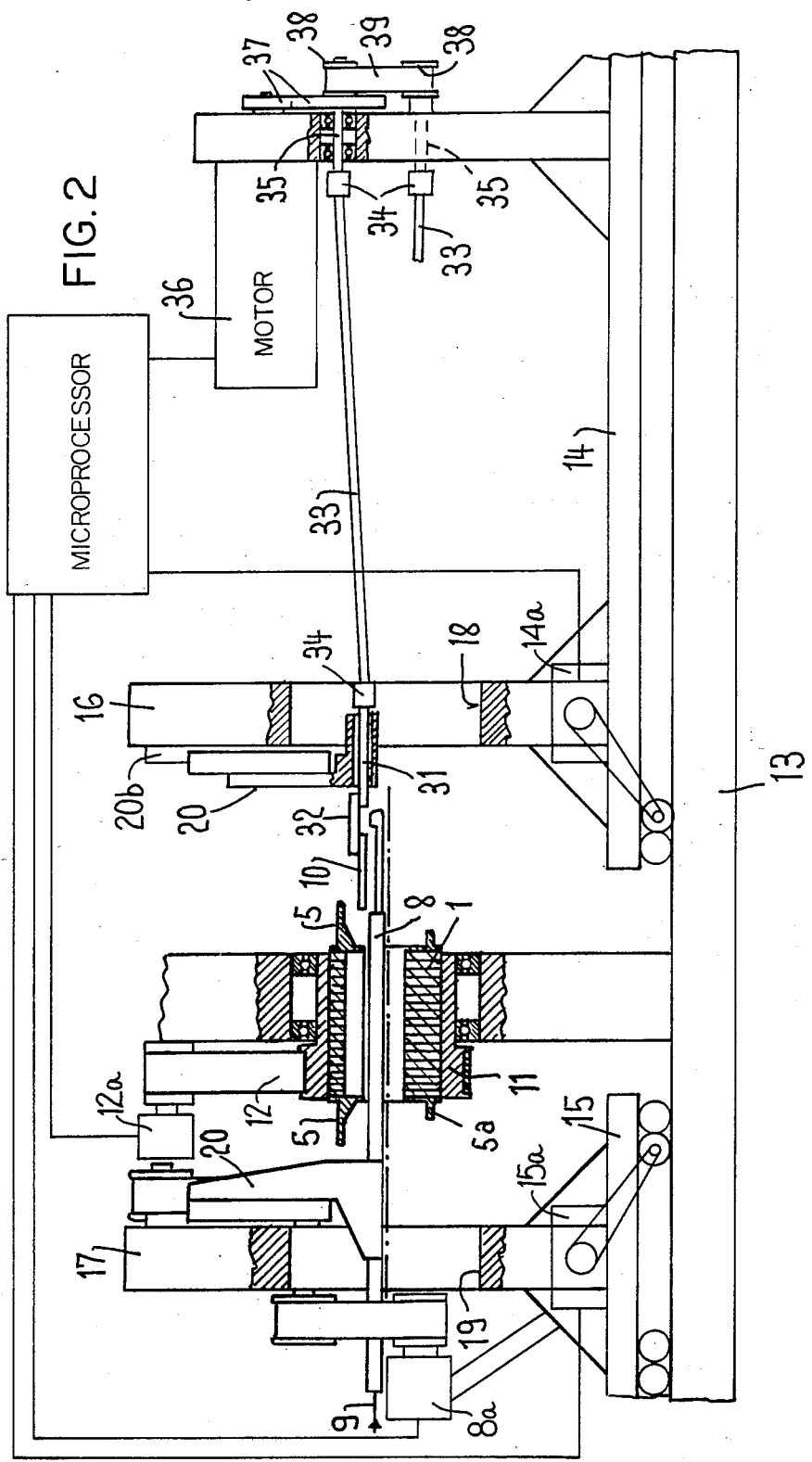
FIG. 2 is a side view, partially in section, of the winding machine.

Before describing the winding operation the mechanisms will now be explained by which the required cyclic displacements of members 8 and 10 are controlled. The stator 1 is mounted in a rotatable support 11 having a cylindrical bore (FIG. 2). This support 11 may be rotated by determined angles by means of a toothed belt 12 from a motor 12a, e.g. by a stepping motor. Two supports 14 and 15 are displaceable in axial direction that is in the direction of the axes of the stator 1 and of support 11 respectively on an axial bed 13 of the winding machine. Supports 14 and 15 may be axially shifted independently of each other by means of motors, e.g. stepping motors 14a and 15a. Similar plates 16 and 17 respectively, having each an opening 18 and 19 respectively are connected to each of slides 14 and 15 respectively.

Figure 3:
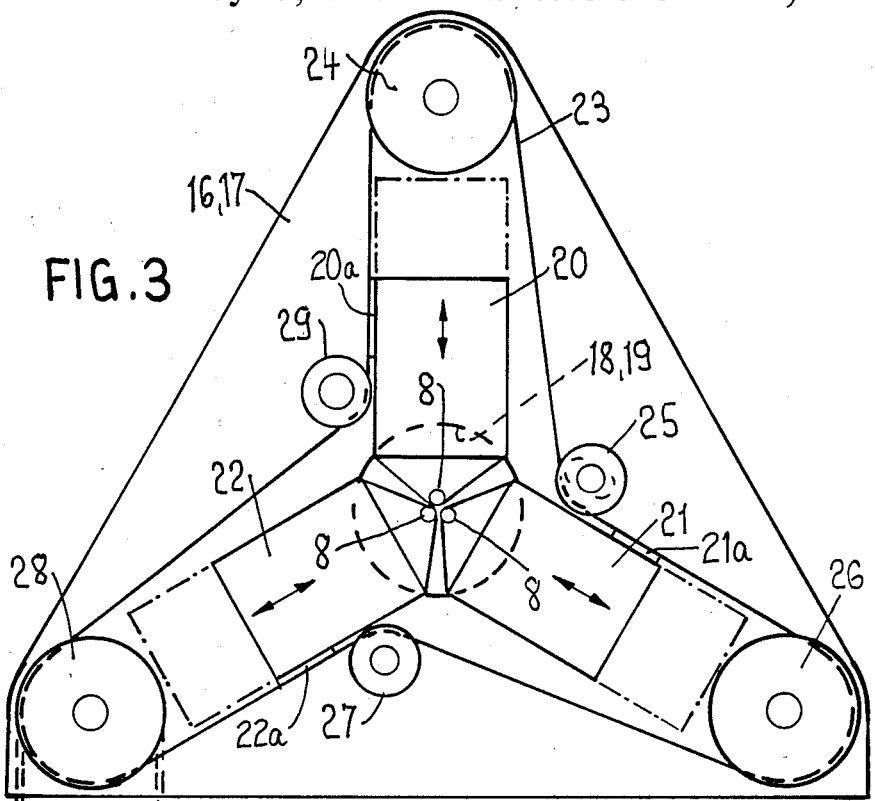
FIG. 3 shows a side-view of the adjusting mechanism for the wire delivering members.

One of these plates 16 or 17 is shown in FIG. 3 in front view. Three slides 20, 21 and 22, mounted on plate 16 by mounting means of conventional construction (e.g., element 20b in FIG. 2), which may be radially displaced along axes staggered by 120° are mounted in axially symmetrical positions relative to opening 18 and 19 at the side facing stator 1 of each plate. A common toothed belt 23 supported on rollers 24 to 29 may be driven by motor 30a through a toothed belt 30 and toothed wheel 28. Each slide 20, 21 and 22 is connected to the adjacent section of toothed belt 23 by known connection means 20a, 21a and 22a, respectively, whereby all these slides may radially be displaced in synchronism by any displacement of belt 23. A wire delivering member 8 is connected to each of slides 20 to 22 of plate 17, only one of these members 8 being shown in FIG. 2 for the sake of simplicity.

A shaft 31 is rotatably mounted in each of slides 20 to 22 of the plate 16, each of these shafts 31 being disposed coaxially to one of the wire receiving members 10 connected to the shaft by an eccentric carrier 32. Again FIG. 2 only shows one of these wire receiving members but each of the three slides 20 to 22 have a wire receiving member 10 and a shaft 31 which are disposed in axially symmetrical positions. Shafts 31 and the wire receiving members 10 respectively are driven each by means of a universal-jointed shaft 33 having a universal or cardan joint 34 on each end, from driven by shafts 35. The upper shaft 35 shown in FIG. 2 may be driven by a motor 36 through a gear 37. A synchronous drive of all shafts 35 and wire receiving members 10 respectively is accomplished. Similar toothed wheels 38 are fixed on each of the shafts 35 these wheels 38 being driven by a common toothed belt 39. It should be clear that by means of adjusting motors 9a, 12a, 14a, 15a, and 36 members 8 and 9 may be adjusted axially and radially within predetermined ranges, and the wire receiving members 10 may additionally be rotated about their longitudinal axis.

Since the members 8 and 10 need not enter into the slots of the iron body their cross section is not limited by slot dimensions. However, these members should also be slim enough in order that the three wire delivering members 8 may simultaneously pass through the bore of the iron body and that all members 8 and 10 may radially pass between supporting pins 5 or 5a if necessary. Each member 8 and 10 has an appreciable wall thickness outside its bore 8a and 10a respectively, so that guiding surfaces or nozzle surfaces with relatively great radii of curverature may be formed at the outlet end of member 8 and at the input end and output end of member 10. The bore 10a acts as a means for wire capture by rotation of the wire receiving member 10. FIG. 4 indicates that a wire 9 running through both members 8 and 10 is deflected around a relatively big radius, this being important for its careful handling and also for the forces required for laying out the wire.

The wire delivering member 8 has a symmetrical wire delivering opening or nozzle having a curved section extending through about 180°, and the wire receiving member 10 has a wire input and a wire delivering opening or nozzle of a curved section extending through about 90°. Member 8 has a recessed portion 40 at its outside, the axial length of this portion slightly exceeding the length of member 10 in order that member 10 may enter into the recessed portion until it abuts against the bottom of the recessed portion. This is seen from FIG. 6 which also shows that a wire 9 extending backwardly at the outside of member 8 is within reach of the bore 10a of member 10. In this relative position the wire may be seized by rotating member 8 around its longitudinal axis whereafter the wire may be pulled radially outwardly, e.g. into the position shown in FIG. 4.

In order that the wire may reliably be handled and guided during the winding process it is important that the wire is always under sufficient tension even if during some phases of the winding operation it must be retracted. To this end each of the wires is fed through a tensioning device schematically shown in FIG. 7. Each wire 9 fed from a supply not shown in the drawing is admitted through a guide 41 to a tensioning roller 42 against which it is pressed by means of two pressure rollers 43. The wire then runs through a further guide 44, over a measuring roller 46 biased by a spring 45, a further guide 47, a return pulley 48 and a guide 49 between clamping jaws 50 of a clamping device and from there to one of members 8.

The tension roller 42 is connected to the shaft of a motor 51 connected to the output of a governor 52. The measuring roller 46 is rotatably mounted on a pivotable lever 53 which is biased by spring 45. The sliding contact of a potentiometer 54 is connected to the pivot shaft of lever 53, and potentiometer 54 is connected to the input of governor 52. This governor further has an input for a reference value, connected by line 55 to the microprocessor controlling the machine. Any deviation of the voltage at the sliding contact of potentiometer 54 from the reference value causes a corresponding change of the current in motor 51 in such a way that the tension in the wire approaches the reference value. By adjusting of the reference value during one operating cycle, that is during winding of a turn of wire the wire tension may always be optimally adjusted to the momentary conditions. Usually, motor 51 will develop a torque which is opposite to the rotating direction that is the motor has a braking effect for tensioning the wire, but during phases of very high forward speed of the wire the motor may temporarily be driven in its rotating direction.

The separate steps during production of one turn of an inner coil 6 will now be described. This description starts with the steps for winding the wire at the side of the wire receiving member 10 because these steps are more complicated. These steps are illustrated by means of FIGS. 8 to 20. The description will start from the position shown in FIG. 8 which corresponds to the position shown in FIGS. 4 and 5. The wire delivering member 8 is in its foremost end position or in wire transmitting position and the previously inserted wire extends in stretched condition through one of the slots 2 from the opposite face of stator 1 to the fore end of member 8. The following operations will now follow whereby the wire delivering member will be called WDM while the wire receiving member will be called WRM.

Figure 8:
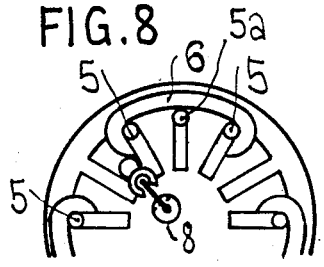
FIGS. 8 to 20 illustrate the movements for applying a turn onto a coil end at the side of the wire receiving member.
Figure 9:
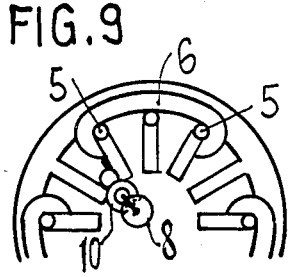

(1) WRM is displaced radially inwardly until it touches WDM. The wire tension is kept low. The positions according to FIGS. 8 and 9 are reached.

Figure 10:
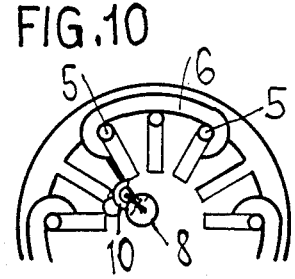

(2) WRM is turned counter-clockwise by 90° and reaches the position according to FIG. 10. Wire tension low.

Figure 11:
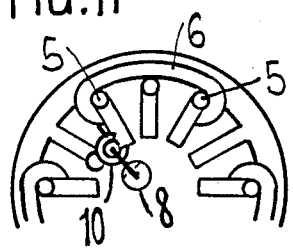

(3) WRM is moved radially outwardly until it is outside the coil end and reaches a position according to FIG. 11. Wire tension low.

Figure 12:
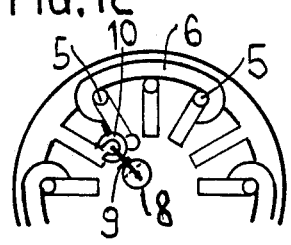

(4) WRM again is turned counter-clockwise by about 140° and reaches a position according to FIG. 12. Wire tension low.

Figure 13:
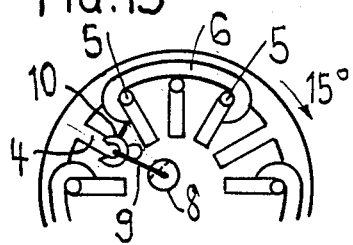

(5) Stator is rotated by 15° in clockwise direction whereby the position according to FIG. 13 is reached.

WRM is located symmetrically in front of a web 4 and between the ends of coils 6. Wire tension low.

Figure 14:
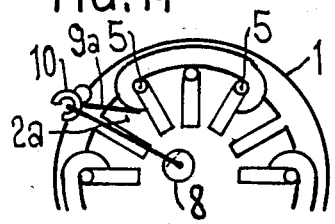

(6) WRM is moved radially outwardly without contact with the coil ends and reaches the position according to FIG. 14 outside the supporting pins 5 and 5a respectively. Wire tension low. The wire section 9a is completely pulled into slot 2a and is tightened therein.

Figure 15:
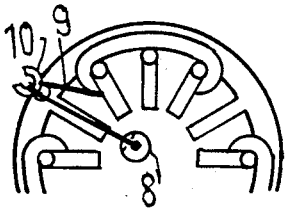

(7) WRM rotates clockwise by 90° and reaches the position according to FIG. 15. Wire tension low.

Figure 16:
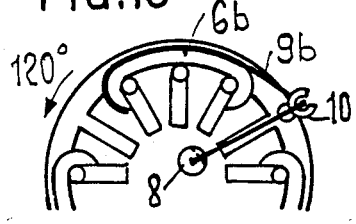

(8) The stator rotates counter-clockwise by 120° whereby the relative position according to FIG. 16 is reached. The wire section 9b has been laid onto the coil end 6b. Wire tension low.

Figure 17:
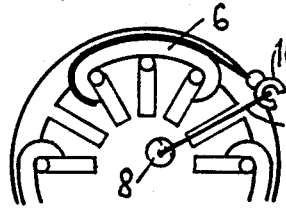

(9) WRM rotates clockwise by 50° and reaches the position according to FIG. 17. Wire tension low.

Figure 18:
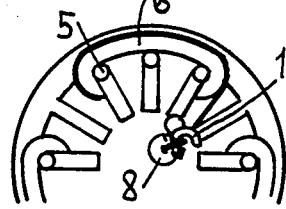

(10) WRM is moved radially inwardly and reaches the position according to FIG. 18 practically touching the WDM, that is in the wire transmitting position. Wire tension low.

Figure 19:
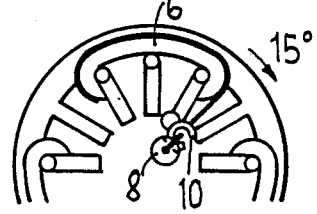

(11) The stator is rotated by 15° in clockwise direction whereby the transmitting position according to FIG. 19 is reached. Wire tension low.

Figure 20:
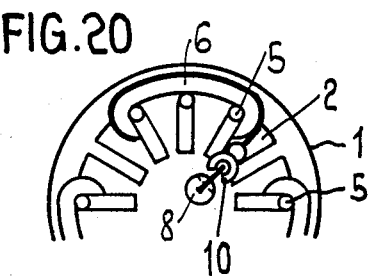

(12) WRM rotates clockwise by 90° and is somewhat moved radially outwardly whereby the position according to FIG. 20 is reached. WRM and WDM are positioned symmetrically in front of slot 2 in which the one side of the coil is located.

(13) WDM is axially pulled back through the bore of the stator to the other side of the same. Simultaneously an order for increasing the wire tension is transmitted to the reference input of governor 52 so that the tension in the wire is increased. Hereby the wire is backwardly pulled out through the opening of WRM and follows WDM whereby the wire which is continuously under tension is inserted into the slot 2 designated in FIG. 20.

(14) WDM is moved radially outwardly until it is positioned in front of the coil end. Wire tension high.

(15) The stator 1 rotates by 15° in anti-clockwise direction in order that WDM may pass outwardly between neighbouring coil ends. Wire tension high.

(16) WDM is further moved radially outwardly into a position outside the supporting pins 5. Wire tension high.

(17) The stator is rotated in clockwise direction by 120°, whereby the wire is laid out onto the backward coil end. Wire tension high.

(18) WDM is displaced into its inner end position and it is located symmetrically in front of a web 4 of the stator between the neighbouring coil ends. Wire tension high.

(19) The stator rotates in anti-clockwise direction by 15° so that WDM is now symmetrically located in front of that slot in which the other coil side is located. Wire tension high.

(20) The wire tension is reduced to the low value and WDM is axially advanced into the position according to FIG. 4. Thereby the wire is inserted into slot 2 with a proper tension. Since the position according to FIG. 4 is now reached the cycle is closed and another cycle as described may start for producing the next turn of the coil.

Of course, the same operations 1 to 20 described above are simultaneously executed at all three wire delivery members and wire receiving members such that a turn of three coils is always simultaneously wound. If the inner coils 6 have been wound in this way, the stator is turned by 270° in the counter-clockwise direction whereby the initial position for winding the outer coils 7 is reached. Pairs of diametrically opposite coils 6 and 7 are connected in series and form the winding of one phase. Of course, the above rotation of the stator by 270° occurs when the member 8 or 10 delivering the wire end onto the winding is positioned radially outside the already produced inner coils 6 and the supporting pins 5 in order that the connecting wire is laid outside the coils. One advantage of this winding system resides in that all coils may be wound in the same winding sense, this meaning that the movements of members 8 and 10 and of stator 1 may always be controlled in the same manner. However, when winding the outer coils 7 of which the ends are axially outside the ends of coils 6 it is necessary to provide for different axial and possibly also different radial movements than when winding the inner coils 6. Control by a microprocessor would even allow modification of the program of displacement during the winding operation of each coil. It is also possible to modify displacing speeds and the wire tension, that is, all parameters of the winding operation may optimally be adjusted at any time.

Different modifications of the embodiment described above are possible. As set out above more than three coils may be wound at a time with machines of higher pole number. However, it is also possible to wind one single coil at a time by means of one single pair of a wire delivering member and a wire receiving member. Other kinds of windings are feasible. Instead of the sleeve shaped wire receiving member 10 two hooks of the same cross section or shape may be provided on a carrier spaced from each other. The hooks are the means for wire capture intead of the bore 10a. Different supporting members for the coil ends may be provided, particularly when the diameter and number of poles of the machine are higher. Instead of the short supporting pins 5a somewhat broader supporting segments may be provided as will be explained in detail below.

Figure 7:
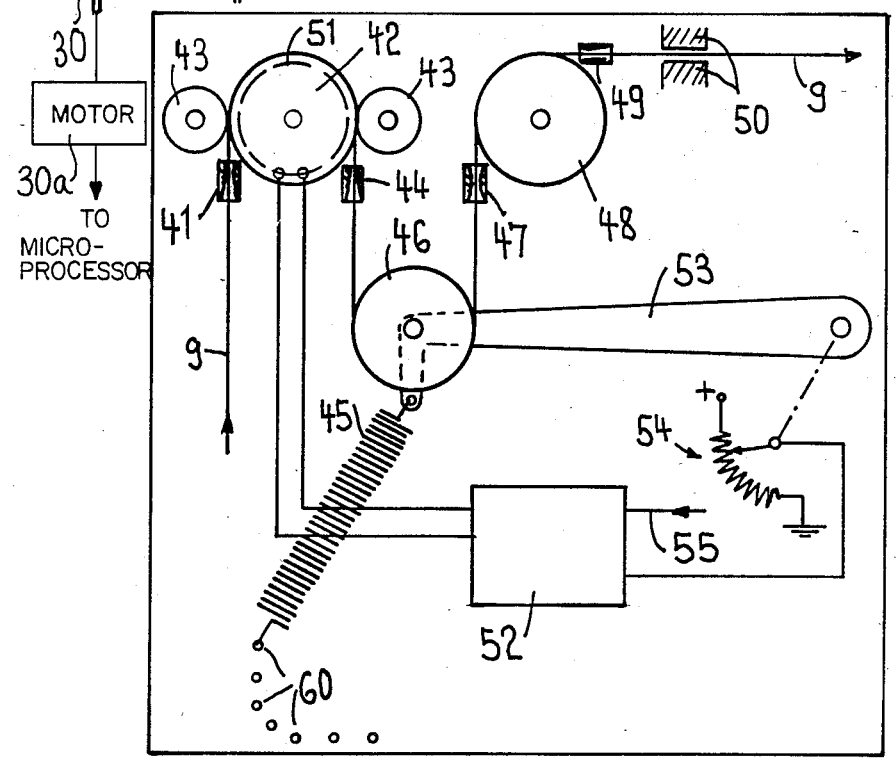
FIG. 7 shows a wire tensioning device.

It should be noted that the inventive concept of the wire tensioning device may be used for other purposes, particularly for different winding machines. Different modified embodiments of this wire tensioning device are possible. In the simplest case the governor 52 may be omitted and the motor 51 is fed with a constant current in order to produce a constant torque opposite to the rotating direction so as to create a constant tension in the wire or any other element running through the tensioning device. In this simpliest case the measuring roller 46 may also be omitted or its only function would be to equalize transitory differences in the pull and/or the speed of the wire. FIG. 7 shows different members 60 for attaching the spring 45. By attaching this spring to different of these members 60 different ranges within which the pull in the wire may be adjusted may be selected. The clamping jaws 50 of the wire tensioning device serve for securing the wire during set up of the winding machine and when a completely wound stator is replaced by a new unwound stator. For carrying out this replacement one of the supports 14 or 15, preferably support 14 is sufficiently removed in order to allow removal of a wound stator and for inserting a new one. It should be noted in this connection that the winding operation starts with the above described operation 13 as soon as the wire ends are attached at the fore side of the stator that is on the right in FIG. 2.

The supporting pins 5 and 5a might possibly be omitted if the coils are wound onto filling bodies located at the faces of the iron body. After removal of such filling or supporting bodies, the coil ends might be shaped as usual by axially inward and radially outward pressure thereon.

Instead of rotating the iron body for laying out the wire onto the coil ends the sets of wire delivering members and wire receiving members might be rotated relative to the iron body.

From FIGS. 8 to 20 and from the associated description of the movement it may be seen that the carrier 32 of the wire receiving member 10 would displace the wire to the side with certain relative positions of members 8 and 10, this being not shown in the drawing. Since winding is always effected in the same sense and consequently the wire receiving member is always carrying out the same movements, contacting and deflection of the wire by the carrier 32 might be avoided in that this carrier 32 is not disposed symmetrically opposite the slit of the wire receiving member but displaced by 270° relatively to the slit as shown in FIGS. 5 and 6 in dash-dotted lines.

Figure 21:
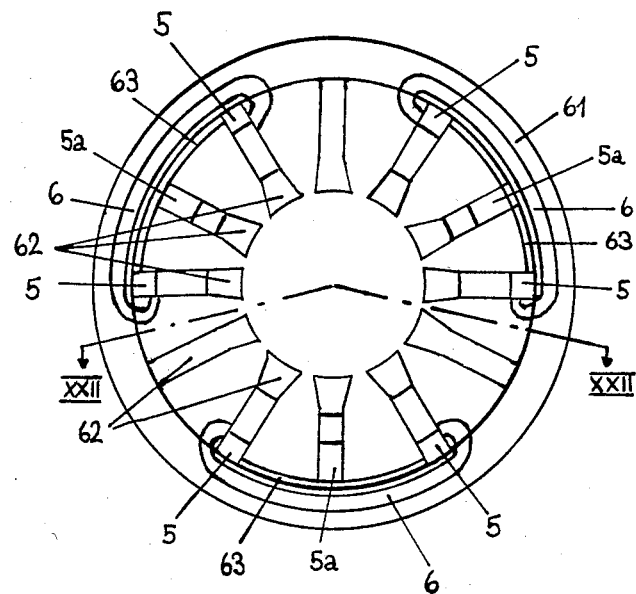
FIG. 21 is a front elevational view of a supporting and insulating ring.
Figure 22:
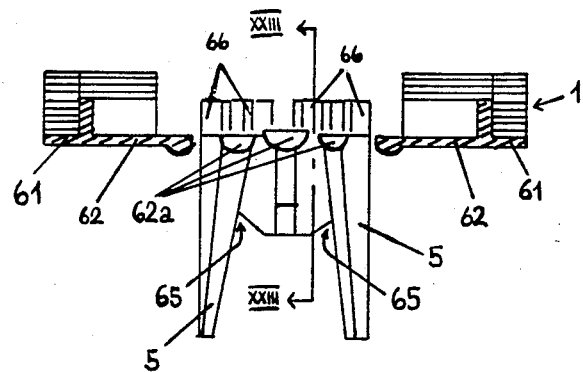
FIG. 22 is a sectional view thereof taken along line XXII/XXII of FIG. 21.
Figure 23:
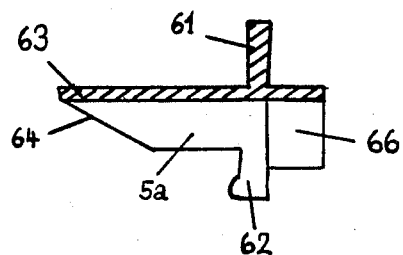
FIG. 23 is a sectional view taken along line XXIII/XXIII of FIG. 22.

Injection of a complete insulating coating traversing the slots of the stator as mentioned above may be replaced by attaching prefabricated supporting and insulating rings at each face of the stator. One preferred embodiment of such a ring from plastic material is illustrated in FIGS. 21 to 23, whereby FIG. 21 is a front view onto the stator provided with the inner coils 6 only, FIG. 22 is a section along line XXII—XXII in FIG. 21 and FIG. 23 is an enlarged partial section along line XXIII—XXIII in FIG. 22. The ring has a flat ring-shaped radial flange 61 contacting the face of the stack of sheets 1 as shown in FIG. 22. From this flange 61 covering ribs 62 extend radially inwardly, each of such ribs 62 covering the face of a web 4 of the stack of sheets 1. These covering ribs 62 are widening inwardly and they are broader in circumferential direction than the poles of webs 4 at least at their inner end. The covering ribs 62 are axially thickened at their inner end, whereby bosses 62a are formed by which the wire is properly guided into the slot openings, whereby the wire is properly guided around the sharp corners of webs 4 and cannot be damaged.

Long supporting pins 5 of substantially rectangular cross section are formed near the outer end of six covering ribs 62. No supporting pins are provided in the range of three further covering ribs. Short supporting pins 5a are formed at the outer end of three further covering ribs 62 and such short supporting pins 5a are bridged each by a supporting wall 63 extending between two adjacent long supporting pins 5 and formed integrally with them. As particularly seen from FIG. 23, the short supporting pins 5a have an inclined face 64 at their outer end, this inclined face simplifying handling of the wire during the winding operation. The supporting walls 63 have their maximum axial extension or length in their middle outside the short supporting pins 5a and they are bevelled at their sides towards the long supporting pins 5. Therefore, triangular recesses 65 are formed between the long supporting pins 5 and the supporting walls 63, such recesses 65 allowing a tight winding and direct contact of the outer coils 7 and the inner coils 6. The supporting walls 63 allow an optimum support of the inner coils 6 in the range of the slots receiving the outer coils 7 and consequently an optimum utilisation of the winding space. As a result a very compact winding having a small proportion of inefficient copper and consequently a high specific power with high efficiency is obtained.

At their rear side the supporting and insulating rings have U-shaped insulating collars 66 opening inwardly and engaging each into a slot of the iron stack 1. Insulating sheets of paper are inserted into the slots between collars 66. The production is particularly simple in that the prefabricated rings may be stuck with their insulating collars 66 into the slots of the iron stack. No other measures for fixing the rings are required.

This invention not only relates to a winding method, a winding machine and executed windings of any desired number of poles, but the winding may also be designed and connected for any desired number of phases. With electronically controlled motors there are no limitations in the number of phases, whereby the continuity of torque produced and rotating speed of the motor may be improved by increasing the number of phases.

What I claim:

1. An apparatus for winding an annular ferromagnetic body for a rotating electric machine, the body having axial and radial axes, a central bore having slots therein, each slot having a radial depth and an axial length, for receipt of loops of wound wire coils, and a pair of opposed first and second faces, said apparatus comprising:
    (a) a body support;
    (b) a wire delivering member cooperating with said support, having a wire delivering bore for feeding of wire therethrough to be wound on the body;
    (c) first positioning means, mechanically coupled to said wire delivering member, for positioning said wire delivering member proximate the first face of the body, and for translating said wire delivering member relative to the body along the axial axis through the body bore toward the second face of said body, and along the radial axis;
    (d) a wire receiving member cooperating with said body support, having means for capture of wire by rotation of said wire receiving member;
    (e) second positioning means, coupled to said wire receiving member, for positioning said wire receiving member proximate the second face of the body, for translating said wire receiving member relative to the body along the axial and radial axes, and for rotating said wire receiving member; and
    (f) control means, electrically connected to said first and second positioning means, coordinating translation and rotation of said wire delivering member and said wire receiving members, for actuating translational movement of said wire delivering member through the body bore towards the second face thereof, actuating said wire receiving member to capture wire from said wire delivering member and translating the wire relative to the body and releasing the wire, and translating said wire delivering member through the body bore back to the first face thereof to form a coil loop.

2. The winding apparatus as recited in claim 1 further comprising motor means coupled to said support and responsive to said control means for selectively rotating said support relative to said body axial axis and so for angularly displacing the body with respect to the wire delivering member and wire receiving member.

3. The winding apparatus as recited in claim 1, further comprising means for feeding wire through said wire delivering member bore, the wire feeding means having;
    (a) a tensioning roller for tensioning the wire, (b) a tensioning motor mechanically coupled to said tensioning roller for driving said tensioning roller, (c) means mechanically coupled to the wire for sensing tension in the wire, and (d) means, electrically connected to said motor and responsive to said tension sensing means, for varying current to said tensioning motor responsive to the sensed tension in the wire.

4. The winding apparatus as recited in claim 3 wherein said means for sensing tension in the wire comprises a translatable measuring roller having the wire passed therearound, means for measuring roller translation, and a potentiometer coupled to said measuring roller for varying voltage output in response to said measuring roller translation.

5. The winding apparatus as recited in claim 4 wherein said means for varying current to said tensioning motor comprises a governor coupled to said potentiometer.

6. The winding apparatus as recited in claim 5 wherein:

(a) said tensioning motor is drivable in two directions, and (b) said governor is coupled to said control means to that said governor also varies current to said tensioning motor in response to signals generated by said control means.

7. The winding apparatus as recited in claim 1 wherein said wire receiving member has a tubular member having a slot therethrough for captured passage of the wire therein.

8. The winding apparatus as recited in claim 7 wherein:

(a) said wire receiving member slot is bevelled and subtends approximately 90° of tubular circumferential arc and said tubular member has curved ends having a radius of curvature greater than a radius of the wire, and (b) the wire delivering member bore is concentrically aligned therein and has a curved nozzle for exit of wire therefrom, having a radius of curvature greater than a radius of the wire.

9. The winding apparatus as recited in claim 8 wherein:

(a) said wire delivering member is tubular and has a recessed portion proximate said nozzle for receipt of said tubular wire receiving member, and (b) said tubular wire receiving member is coupled to an eccentric carrier for rotation of said wire receiving member slot into said wire delivering member recessed portion, for capture of the wire in said wire receiving member slot.

10. The winding apparatus recited in claim 9 wherein:

(a) said first positioning means includes a wire delivering member slide means, mechnically coupled to said wire delivering member, for radial translation of said wire delivering means relative to the body and a wire delivering member support means, mechanically coupled to said wire delivering slide means, for axial translation of said wire delivering member slide means, and so said wire delivering member, relative to the body; and wherein (b) said second positioning means includes a wire receiving member slide means, mechanically coupled to the wire receiving member, for radially translating and rotating said wire receiving member relative to the body, and a wire receiving member support means, mechanically coupled to said wire receiving member slide means, for axial translation of said wire receiving member slide means, and so said wire receiving member, relative to the body.

11. The winding apparatus as recited in claim 10 wherein a plurality of paired wire delivering member and wire receiving members are symmetrically positioned and are symmetrically translatable relative to the axial axis.

12. The winding apparatus recited in claim 1 wherein:

(a) said first positioning means includes a wire delivering member slide means, mechnically coupled to said wire delivering member, for radial translation of said wire delivering means relative to the body and a wire delivering member support means, mechanically coupled to said wire delivering slide means, for axial translation of said wire delivering member slide means, and so said wire delivering member, relative to the body; and wherein (b) said second positioning means includes a wire receiving member slide means, mechanically coupled to the wire receiving member, for radially translating and rotating said wire receiving member relative to the body, and a wire receiving member support means, mechanically coupled to said wire receiving member slide means, for axial translation of said wire receiving member slide means, and so said wire receiving member, relative to the body.

13. The winding apparatus is recited in claim 12 wherein a plurality of paired delivering members and wire receiving members are symmetrically positioned and are symmetrically translatable relative to the axial axis.

* * * * *